United States Patent [19]

Horner et al.

[11] 3,824,989
[45] July 23, 1974

[54] ANIMAL ESTRUS DETECTOR
[76] Inventors: Tommy Dean Horner, 1450 Kendall, Apartment 5G, Lakewood, Wis. 80214; Charles Ewing, Jr., 6004 Johnson Way, Arvada, Colo. 80004
[22] Filed: May 31, 1973
[21] Appl. No.: 353,378

[52] U.S. Cl.................. 128/2 H, 119/1, 401/88, 118/76
[51] Int. Cl...................... A01k 11/00, A61b 10/00
[58] Field of Search.......... 119/1, 29, 109; 128/2 H; 54/1; 401/88

[56] References Cited
UNITED STATES PATENTS
| | | | |
|---|---|---|---|
| 1,237,983 | 8/1917 | Werner | 119/1 |
| 2,678,022 | 5/1954 | Jourgensen | 118/76 |
| 3,076,431 | 2/1963 | Rule et al. | 119/1 |
| 3,158,133 | 11/1964 | Larson | 119/1 |
| 3,603,291 | 9/1971 | Baker | 119/109 X |

FOREIGN PATENTS OR APPLICATIONS
| | | | |
|---|---|---|---|
| 152,488 | 7/1970 | New Zealand | 119/1 |

*Primary Examiner*—Aldrich F. Medbery

[57] ABSTRACT

A heat or estrus indicator for animals has been devised which is in the form of a harness or collar adapted to be releasably attached to the bull animal with an applicator unit for dispensing a marker material onto the back of the female animal during simulated or actual coition, the heat indicator being characterized by metering the supply of marker material through the applicator from one or more reservoirs which are incorporated into and form a part of the harness.

8 Claims, 6 Drawing Figures

PATENTED JUL 23 1974 3,824,989
SHEET 1 OF 2

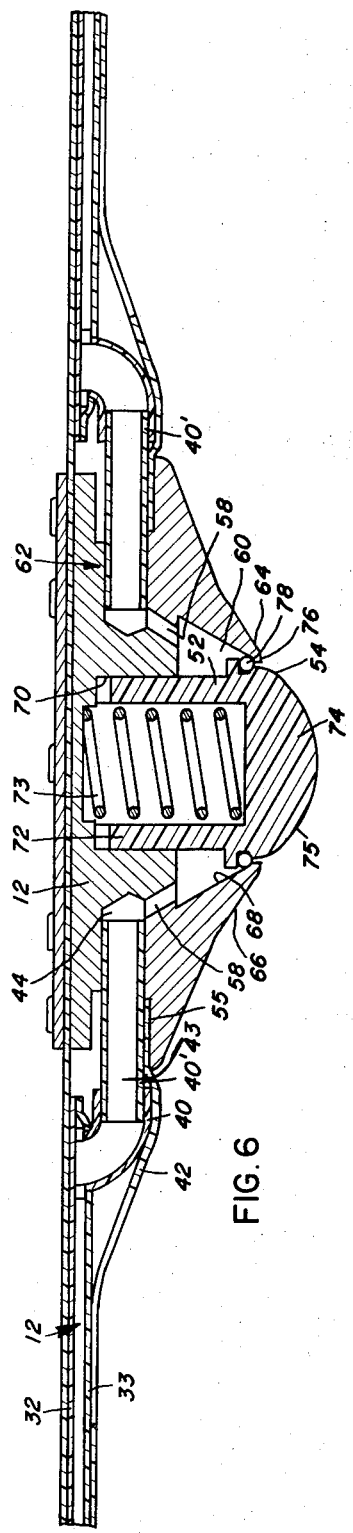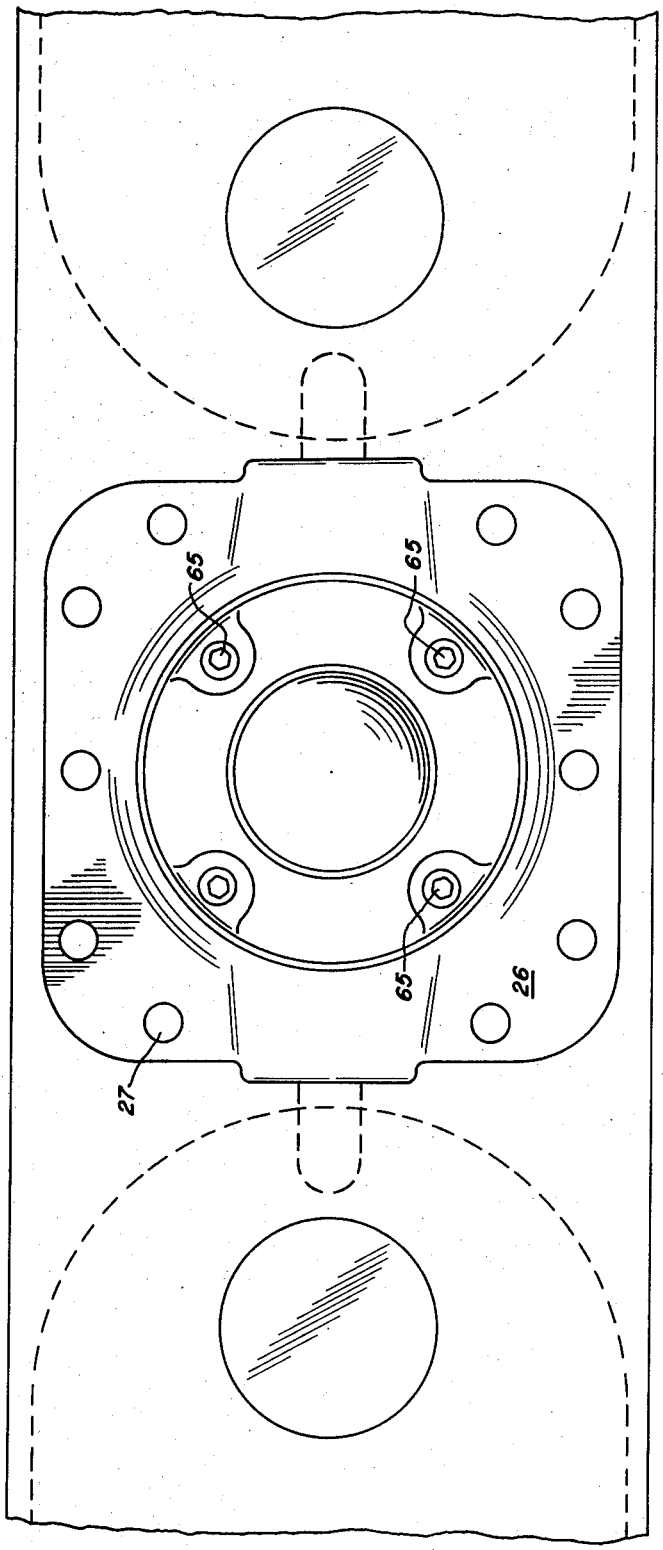

ANIMAL ESTRUS DETECTOR

BACKGROUND OF THE INVENTION

This invention relates to a new and improved marking device to be worn by the bull or other animal which places a mark on the female animal during coition between the animals. In particular an improvement is made which allows a substantial reserve of the marking material to be stored on the animal, and meters its use so as not to deplete the reservoir supply any more than necessary to mark the female animal.

In the prior art, markers have been devised which are strapped to the male animal with an adjustable harness, in which the marking means is a crayon or other marking means held by the harness on the upper chest of the male animal, and during coition the crayon or other marking means comes in contact with and makes a mark on the back of the participating female animal. In this way, it can be determined which female animals are in heat. In the past, however, marker devices have been absent a sufficient supply of marking material, as a result of which the male animal or bull after repeated coition with a number of female animals will deplete the marker material, and fail to properly mark the animal.

SUMMARY OF THE INVENTION

Accordingly, it is an object of the present invention to provide a novel and improved marking device for animals which is reliable and highly effective in marking animals during simulated or actual coition.

It is another object of the present invention to provide a durable marker which will survive the normal activities of the male animal without depleting the supply of marker material.

It is another object of the invention to provide a metered marking device which is capable of dispensing and applying onto the female selected amounts of marking material during each act of coition between a male and female animal.

It is another object of the invention to meter the flow of marking material so that adequate yet not wasteful marking occurs and to draw the required amounts of material from a reservoir incorporated in a unique manner in the body of a harness which is releasably attached to the male or other animal.

It is another object of the invention to provide for easy renewal of the marking material supply.

In accordance with the present invention, an animal heat indicator or marking device can be releasably secured around the neck of the bull animal such that during coition between the bull and the female animal, a regulated amount of marker material will be released by the device onto the back of the female animal. This is accomplished by reservoirs incorporated into the body of a strap or harness and communicating through one or more orifices with a chamber disposed in surrounding relation to a spring-loaded plunger, the orifices being sized to limit and to regulate the amount of liquid marker material fed from the reservoirs. The dispenser or applicator includes a spring-loaded plunger or other pressure-operated valve member which will dispense limited quantities of the material when pressed against the back of the animal; however the amount dispensed will be regulated by the orifice or other metering means. As a result, notwithstanding repeated use over a short period of time, the amount of marker material supplied to the applicator can be regulated to assure marking of each animal. An additional feature is the construction of the reservoirs in the form of flexible pouches built into opposite sides of the strap or harness for attachment to the animal with fill openings at the upper ends of the pouches to permit filling without removal of the strap from the animal; also flexible connections between the pouches and dispenser permit gravity flow of material into the dispenser as regulated and controlled by the metering means.

BRIEF DESCRIPTION OF THE DRAWING

Other objects, advantages and features of the present invention will become more apparent as the description proceeds taken in conjunction with the accompanying drawings, in which:

FIG. 5 is a view on an enlarged scale of the top of the dispenser portion.

FIG. 6 is a cross-sectional view taken on lines 6—6 of FIG. 4.

DESCRIPTION OF THE PREFERRED EMBODIMENT

Figure 1:
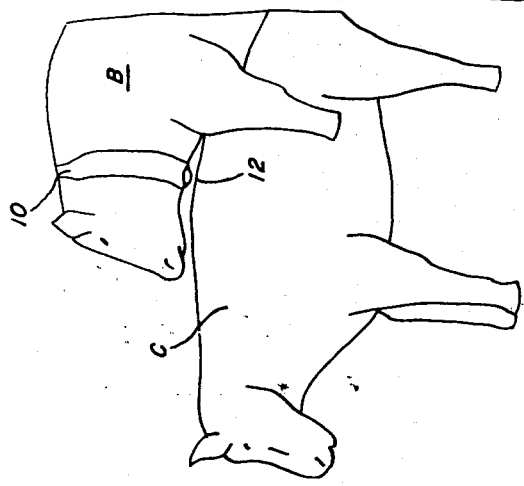
FIG. 1 illustrates cattle during coition and the preferred location of the chest indicator on the bull.
Figure 4:
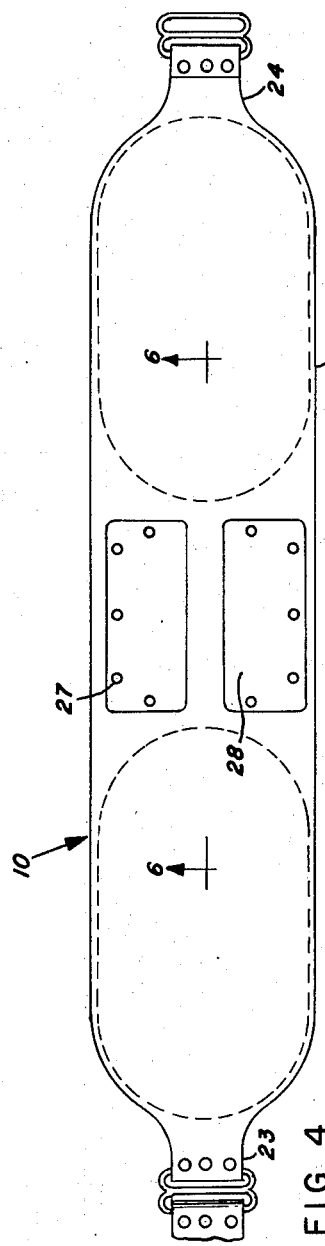
FIG. 4 is another elevational view of the back or inner surface opposite to the front side of the device as illustrated in FIG. 1.
Figure 3:
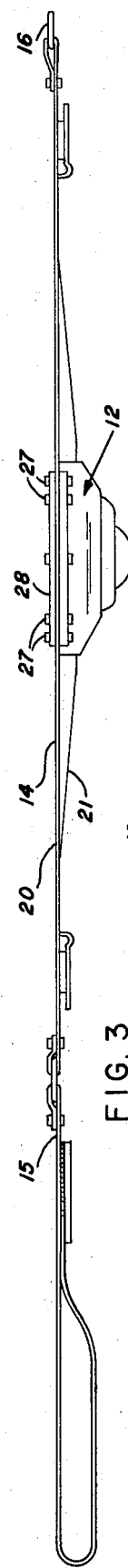
FIG. 3 is a side elevational view of the device illustrated in FIG. 2.
Figure 2:
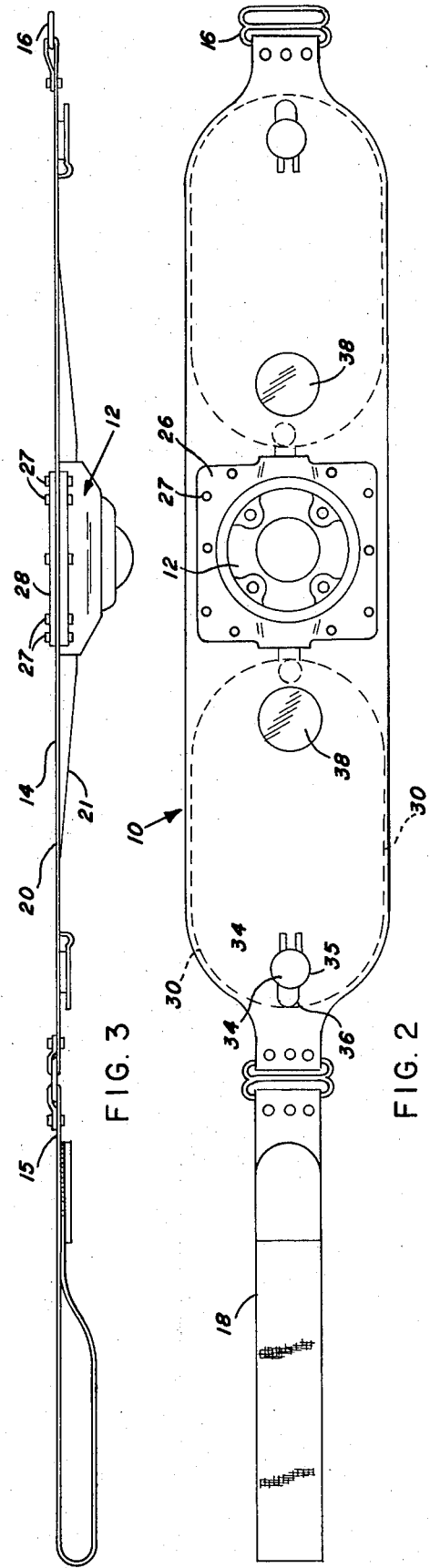
FIG. 2 is a front elevational view of a preferred form of heat indicator in accordance with the present invention.

Now referring in more detail to the drawings, there is shown by way of illustrative example in FIG. 1, the preferred location of a marker device 10 in accordance with the present invention encircling the neck of a bull animal B so that during coition a dispenser 12 will be caused to rub or contact the back of the female animal C and to dispense some suitable form of marker material, such as, a liquid dye onto the back of the female animal. The bull will usually have coition with a number of animals over a limited time period. Accordingly, it is highly desirable that there be a sufficient quantity of marker material available for marking each female animal to indicate which ones are in heat and that the marking material be metered in such a way as to regulate the amount dispensed.

In accordance with the present invention and as illustrated in FIGS. 2–6, the preferred form of marker 10 is broadly comprised of a dispenser unit 12 which is affixed to a collar or harness 14, the latter provided with a strap 15 at one end and a buckle 16 at the opposite end. The marker device 10 is most conveniently placed around the bull's neck and secured in place by passing the strap 15 through the buckle 16 and adjustably fastened so that the collar will snugly encircle the bull's neck without causing any discomfort. In the preferred form, the strap 15 includes a strip composed of Velcro, as represented at 18 so that when the strap is doubled back upon itself the free end of the Velcro strip can be positively fastened to another section of the Velcro strip with the buckle 16 securely affixed or sandwiched between the Velcro sections.

An important feature of the present invention resides in the construction and arrangement of the collar 14 so as to define an enclosure for a reservoir of marker or dye material which is to be selectively metered into the dispenser unit 12. For this purpose, the collar is made up of inner and outer layers 20 and 21, respectively, which are suitably composed of a flexible material such as a fabric or plastic formed into elongated sections 22 provided with reduced end sections 23 and 24, for connection of the strap 15 and buckle 16, respectively. In forming the layers 20 and 21 of a thermoplastic material, the outer edges of the layers 20 and 21 may be heat-sealed or otherwise cured together so as to form envelopes, and the envelope portions separated by the dispenser unit 12 which has a base portion 26 attached centrally of the collar by suitable means such as bolts 27 passing through both layers 20 and 21 as shown into a reinforcing or backing plate 28 behind the dispenser 12. A reservoir of marker material is retained in each of the envelopes formed between the layers 20 and 21 of the collar 14, the reservoir preferably being in the form of a flexible pouch 30 which occupies substantially the entire space formed between the layers 20 and 21 on either side of the dispenser unit. Most desirably the pouch 30 is also composed of a plastic material which can be heat-sealed to the interior of the collar band. The pouch is comprised of inner and outer layers 32 and 33, respectively, of material having its edges heat-sealed together and sealed to the edges of the collar as mentioned. The outer end of the pouch nearest either to the strap or buckle portion 15 and 16 is provided with a fill opening 34 having a removable plastic cap or plug 35 to facilitate filling of the reservoir or pouch with a liquid dye material. The dye material suitably may be non-toxic oil soluble dye available in various colors, one such material being Pylakrone, manufactured and sold by Pylam Products of Queens Village, New York. This material is adapted to be mixed with an oil, such as, 10-wt non-detergent motor oil so that when dispensed it will leave a visible mark on the hide of the animal. It will be seen that the fill spout 34 projects outwardly through a slot 36 in the outer layer 21 of the collar so that it is free to shift limited distances lengthwise of the collar whereby to permit limited movement with respect to the collar when it is strapped around the bull's neck. In addition, a transparent window 38 is bonded or otherwise sealed to the outer layer 21 in order to permit checking of the dye level in the reservoir without necessity of removal from the animal.

As best seen from FIGS. 5 and 6, in order to meter selected amounts of the dye material from the reservoir or pouch 30 into the dispenser 12, a flexible tube 40 extends from an opening in the end of the pouch nearest to the dispenser. The tube 40 is enclosed by an extension 42 of the outer layer 21 of the collar band and is adapted to receive one end of an inner concentric fill tube 43 which is inserted into the tube 40 and extends into the dispenser 12 for communication with an inner chamber 44 in the body of the dispenser 12.

The dispenser 12 broadly is made up of an outer, generally circular casing 50 which converges forwardly or downwardly away from a flange or base section 26 and defines a central chamber or cylinder 52 for a spring-loaded plunger 54. In order to meter or control the amount of liquid supplied to the dispenser, the tube 43 is inserted through a lateral bore 55 in the casing to communicate with an annular groove which forms the chamber 44 within the body of the casing. The annular chamber or groove 44 communicates in turn with diametrically opposed, downwardly extending orifices 58 which lead into an annular recess or cavity 60 formed between the casing 50 and plunger 52.

In the preferred form, the casing is made up in two sections, the upper section being a relatively thick-walled body 62 which includes the flange 26 and circular base of the casing in which is formed the bores 55, chamber 44 and orifices 58. A lower section 64 of the casing is relatively thin-walled and converges forwardly or downwardly from the body 62 and is attached to the body by a series of bolts 65 at equally spaced intervals around the casing. Here the external surface 66 of the casing section 64 is tapered forwardly as a continuation of the external surface of the body 62, and inner wall 68 similarly converges or tapers forwardly from a point just outwardly of the orifices 58 so as to define an enlarged recess or cavity 60 in surrounding relation to the lower end of the plunger 54. In addition, the body 62 includes a cylindrical recess or chamber 70 for insertion and slidable movement of the upper end of the plunger 54.

The plunger or piston 54 is preferably comprised of a tubular section 72 which terminates at its forward or outer end in an enlarged head 74. The wall section 72 is dimensioned for close-fitting slidable movement through the cylindrical recess 70 in the body 62 and has a coiled spring 73 disposed within the section 72 which biases the plunger in a downward direction through the casing. The enlarged head 74 has an external convex surface 75, and an external groove 76 between the head and wall of the plunger has an O-ring 78 which establishes sealed engagement with the forward terminal end of the casing wall 66 when the plunger is in its normal closed position under the urging of the spring 73.

In use, when the marker device 10 is strapped around the neck of the bull, the dispenser 12 will normally be directed downwardly with the reservoirs or pouches curving upwardly around opposite sides of the neck. As a result, the fill tubes 43 will extend downwardly and forwardly from the pouches into the casing 50 of the dispenser 12 so that the marker or dye material will flow under gravity from the pouch into the chamber groove 44, through the orifices 58 and fill up the cavity or recess 60. Since the plunger 54 is normally urged to an outer closed position by the spring the dye material will be filled or sealed within the cavity 60. When pressure is exerted or applied by the bull against the back of the female animal during coition it will cause the head 74 of the plunger to be depressed against the urging of the spring 73 so as to permit a limited quantity of the dye material to flow out of the cavity and to form a film around the outer convex surface 75 of the head of the plunger 54. Accordingly, the marker or dye material will be wiped across the back of the feamle animal so as to leave a clear marking or series of marks. As the dye material is dispensed from the cavity 60, it will be replenished gradually by flow of additional material from the reservoirs through the fill tubes 43, groove 44 and orifices 58 into the cavity 60, and its flow rate will be determined by the size of the orifices. Of course other flow regulating means may be employed in place of the orifices if desired. For example, in using the Pylakrone dye material in a 10-wt oil, the orifices 58 are approximately 1/16 to 1/8 inch in diameter, depending upon the density or specific gravity of the dye material so as to assure regulated but fairly continuous flow of the dye material into the cavity 60. In providing reservoirs on opposite sides of the dispenser, each reservoir or pouch can retain but a limited volume or quantity of the marker material and yet assure more than sufficient supply to last over extended time periods. Utilization of the window openings 38 for each reservoir will permit ready visual inspection of the reservoir to determine when either or both require filling, without necessity of removal from the bull's neck; and, since the fill opening 34 for each reservoir is located at the upper side of the bull's neck, each reservoir may be filled without necessity of removal of the device 10 from the neck. From the foregoing it will be seen that a novel and improved marker device has been devised which will permit periodic checking of female animals in order to spot those that are ready to be bred and eliminate time-consuming observation of the animals.

Although the present invention has been described with a certain degree of particularly, it is to be understood that the present disclosure has been made by way of example and that changes in details of structure may be made without departing from the spirit thereof.

What is claimed is:

1. In a device for marking animals when in heat or estrus wherein a dispenser unit for liquid marking material is releasably suspended and secured by a harness to an animal so that during actual or simulated coition between that animal and another animal the dispensing unit contacts the other animal and dispenses liquid marking material contained in the dispenser unit, the combination therewith of:

a reservoir means for a liquid marking material supply with which to replenish the supply of material in said dispenser unit, said reservoir means being mounted on said harness and connected to said dispenser so as to extend upwardly from said dispenser unit when in place on the animal, and delivery means including a flow passage establishing communication between the reservoir and dispenser unit and metering means in the flow passage for controlling the flow of liquid from the reservoir into the dispenser unit.

2. In a device for marking animals as described in claim 1 in which said flow passage is defined by a flexible tube extending between an outlet in said reservoir and said dispenser unit.

3. In a device for marking animals as described in claim 1, the reservoir comprising a flexible pouch secured between inner and outer layers of protective material, said layers of protective material forming a portion of said harness.

4. In a device for marking animals as described in claim 1, the reservoir including a filler opening with removable filler cap in the uppermost part of the reservoir when said device for marking animals is secured in position on said male animal.

5. In a device for marking animals as described in claim 1 including a window area in the side of said reservoir to allow a visual check of the fluid level in the reservoir.

6. In an animal estrus or heat indicator wherein a dispenser unit for a liquid marking material is releasably secured by securing means to an animal such that during simulated or actual coition between the animal and other animal the dispenser unit includes a pressureoperated, liquid-dispensing valve member which will be caused to contact the other animal and release the liquid marking material held by the dispenser unit, the combination therewith of:

at least one reservoir for holding the liquid marking material comprising a flexible pouch secured between an inner and an outer layer of protective material, said layers incorporated into said securing means and curving with the securing means upwardly around the exterior of the animal when secured in place thereon, said reservoir containing an adequate volume of reserve marking material, and delivery means for establishing a liquid communication and flow passageway between the reservoir and dispenser unit for conducting a supply of said marking material to the dispenser unit to replace the marking material released from said dispenser unit.

7. In an animal heat indicator according to claim 6, said delivery means including metering means in the form of an orifice for regulating the supply of marking material to the dispenser unit.

8. A marking device for animals comprising in combination:

a collar adapted to be releasably secured around the neck of a male animal;

a dispenser unit affixed to said collar so that during coition between that animal and a female animal the dispensing unit contacts the female animal and dispenses liquid contained in the dispenser unit, said dispenser unit including a casing including a chamber therein, a piston movable in said casing between an open position and a normally closed position, said piston being biased toward the closed position and being movable from the closed position to the open position under pressure on the head of the piston and causing an opening between the piston and said casing through which liquid contained in the chamber is released, and seal means between the casing and the piston to form a positive seal against release of the liquid when the piston is in the closed position;

a reservoir on said collar for holding additional liquid with which to replenish the supply of material in said dispenser unit; and a controlled flow passage between the reservoir and dispenser unit including a small orifice by which to deliver a metered flow of liquid from the reservoir to said dispenser unit.

* * * * *

PO-1050
(5/69)

UNITED STATES PATENT OFFICE
CERTIFICATE OF CORRECTION

Patent No. 3,824,989                    Dated 23 July 1974

Inventor(s) Tommy Dean Horner and Charles E. Wing, Jr.

It is certified that error appears in the above-identified patent and that said Letters Patent are hereby corrected as shown below:

In the Inventors' Addresses:

Cancel "Wis." and substitute --Colo.--

In the Title:

Cancel "ANIMAL ESTRUS DETECTOR" and substitute --ANIMAL HEAT AND ESTRUS DETECTOR--

In the Inventors' Names:

Cancel "Ewing" and substitute --E. Wing--

In the Description of Preferred Embodiment:

Column 4, line 37, following "chamber" insert --or--

Signed and sealed this 3rd day of December 1974.

(SEAL)
Attest:

McCOY M. GIBSON JR.
Attesting Officer

C. MARSHALL DANN
Commissioner of Patents